United States Patent [19]

Keogh et al.

[11] Patent Number: 5,134,669
[45] Date of Patent: Jul. 28, 1992

[54] IMAGE PROCESSING SYSTEM FOR DOCUMENTARY DATA

[75] Inventors: Kenneth M. Keogh, Burnsville, Minn.; John V. McMillin, Iowa City, Iowa; Gary J. Gustafson, Burnsville, Minn.

[73] Assignee: National Computer Systems, Minneapolis, Minn.

[21] Appl. No.: 537,293

[22] Filed: Jun. 13, 1990

[51] Int. Cl.⁵ .................... G06K 9/20; G06K 7/12; B42D 15/00
[52] U.S. Cl. .................................... 382/61; 382/17; 382/62; 283/94; 283/115; 250/271
[58] Field of Search .................. 382/61, 57, 17; 250/271; 283/94, 115; 235/454, 468, 494

[56] References Cited

U.S. PATENT DOCUMENTS

| | | | |
|---|---|---|---|
| 3,284,929 | 11/1963 | Azure, Jr. | 235/454 |
| 3,444,517 | 3/1965 | Rabinow | 382/61 |
| 4,021,777 | 5/1977 | Shepard | 382/61 |
| 4,205,780 | 6/1980 | Burns et al. | 235/454 |
| 4,408,344 | 10/1983 | McWaters et al. | 382/57 |
| 4,542,378 | 9/1985 | Suganuma | 382/61 |
| 4,627,819 | 12/1986 | Burrows | 235/468 |
| 4,654,877 | 3/1987 | Shimoni et al. | 382/56 |
| 4,677,551 | 6/1987 | Suganuma | 364/401 |
| 4,685,138 | 8/1987 | Antes et al. | 235/468 |
| 4,760,246 | 7/1988 | Shepard | 235/454 |
| 4,855,580 | 8/1989 | van Maanen, Jr. | 235/440 |
| 4,872,062 | 10/1989 | Nanba | 235/468 |
| 4,873,426 | 10/1989 | Sarna et al. | 235/462 |
| 4,877,948 | 10/1989 | Krneger | 235/454 |
| 4,889,367 | 12/1989 | Miller | 235/468 |
| 4,914,709 | 4/1990 | Rudok | 382/57 |
| 4,972,273 | 11/1990 | Burkhardt et al. | 358/443 |
| 5,001,330 | 3/1991 | Koch | 235/454 |
| 5,003,613 | 3/1991 | Lovelady et al. | 382/61 |
| 5,010,580 | 4/1991 | Vincent et al. | 382/17 |

FOREIGN PATENT DOCUMENTS 63-65589  3/1988  Japan .................................. 382/6

OTHER PUBLICATIONS

Aden, S. G. et al., "Document Format Selection and Control Process", Feb. 1984, IBM Technical Disclosure Bulletin vol. 26, No. 9.

*Primary Examiner*—David K. Moore
*Assistant Examiner*—Barry Stellrecht
*Attorney, Agent, or Firm*—Dorsey & Whitney

[57] ABSTRACT

A method for extracting information from a document bearing (a) first indicia detectable in a first scan mode, using light in a first spectral range, but not detectable in a second scan mode, using light outside the first spectral range, and (b) second indicia detectable in either the first scan mode or second scan mode, where the second indicia represent information encoded in one or more forms decodable by automated symbol recognition resources, comprise several steps. One or more areas of interest on the document are defined in which the second indicia may appear, with the definition including information specifying the form of encoding for the second indicia. The document is scanned in the second mode, using a scanner that produces a pixel image of the indicia detected and the resulting pixel data are stored in a memory device. An area of interest is selected from those defined for the document and the pixel image of that area of interest is processed with an automated symbol recognition resource suitable for the form of encoding specified for the second indicia in the selected area of interest to produce one or more output records incorporating symbol information representative of the second indicia.

17 Claims, 7 Drawing Sheets

PC NEWS

Your 5 minutes could mean 52 weeks of PC News - FREE. Mail in your form today!

```
****************** 5-DIGIT 55435
MW00691914 1066505

JILL AMUNDSON
OTIS MEDIA
7600 PARIS AVENUE N
MEDINA, NM 55435
```

IF YOU WISH TO QUALIFY: Please double-check your form before you send it in! We can't process it unless you 1) answer all questions completely 2) sign and date your form, and 3) use specific numbers when answering questions requesting quantities. Thank you.

I want to continue/receive PC News.   ● Yes   ○ No

In conjunction with my free subscription to PC News, I wish to receive PC News Extra if I qualify.   ○ Yes   ● No

Required: Company name and street address must be written below or application cannot be processed. Please print.

| First Name | Last Name |
| Title | Business Telephone |

OTIS-DEN, INC.

Division

7600 PARIS AVE. N

City: MEDINA  State: NM  Zip: 55435

Signature

*Jill Amundson*

Social Security Number

3 5 6 - 3 8 - 9 6 5 9

1 Primary business activity of your firm at this location:

- ○ Aerospace
- ○ Agriculture, Mining, Const., Oil
- ○ Transportation
- ○ Communications
- ○ Utilities
- ○ Finance, Banking, Accounting, Insurance, Real Estate
- ○ Research/Development
- ○ Engineering/Architecture
- ○ Manufacturing other than Computer Hardware/Software
- ○ Manufacturing Computers, Peripherals, Equipment, DP Hardware, Software
- ○ VAR/VAD/Systems House
- ○ Computer Related Retailer/Distributor
- ○ Non-Computer Retailer/Distributor
- ○ Consultant
- ○ Education
- ○ Government/Federal
- ○ Government/Non-Federal
- ○ Health, Medical Services
- ○ Other businesses and Services
- ● Other (Please specify) *publishing*

4 Please check the scope of your personal involvement in the following: (check all that apply)

| Activities: | Within Your Department | With Multiple Departments | With Other Companies (Customers or Vendors) |
|---|---|---|---|
| Application Development | ● | ○ | ● |
| Programming | ○ | ○ | ○ |
| Systems Design/Development | ● | ○ | ○ |
| Multi-Vendor Systems Integration | ○ | ○ | ○ |
| Networking | ○ | ○ | ○ |
| Distributed Processing | ○ | ○ | ○ |

Comments: ___________

2 Title: (Check one only)

- ○ President/Owner/Partner
- ○ VP - All
- ○ Controller/Treasurer
- ○ Director
- ○ General Manager
- ○ Data Comm/Network Mgr
- ○ Micro Mgr./Specialist
- ○ Project Mgr/Group Leader
- ○ Engineer
- ○ Accountant
- ○ Consultant/Advisor
- ● Systems Analyst
- ○ Programmer/Programmer Analyst
- ○ Educator
- ○ Representative
- ○ Other (Please specify)

Affix bar code below | Subscriber ID

3 Please check below the types of networks that are currently installed and/or planned for installation within the next 12 months at this location. (check all that apply)

| | Workgroup LAN | Dept. LAN | Enterprise LAN | Wide area Network | None |
|---|---|---|---|---|---|
| Installed | ○ | ○ | ○ | ○ | ○ |
| Planned | ○ | ○ | ○ | ○ | ○ |

Send to: PC NEWS SUBSCRIBER SERVICE
P.O. Box 3220  Vergas, MN 34278-8529

IMAGE PROCESSING SYSTEM FOR DOCUMENTARY DATA

RELATED APPLICATION

This application is related to a co-pending application in the United States Patent and Trademark Office filed concurrently with the present application, entitled METHOD AND APPARATUS FOR STORING AND MERGING MULTIPLE OPTICALLY SCANNED IMAGES, Ser. No. 07/537,442, which is assigned to the assignee of the present invention and which is hereby incorporated by reference in the present invention.

TECHNICAL FIELD

The present invention relates generally to the fields of optical mark scanning apparatus, character recognition apparatus and visual imaging scanning apparatus. More particularly, the present invention relates to an image processing system that is capable of capturing scanned images and processing them with various intelligent symbol recognition (ISR) resources, including a bar code reader, an optical mark reader, a font OCR reader, a reader of handprinted numeric data and/or a reader of handprinted alphanumeric data to produce ASCII or equivalent character-based alphanumeric data (hereinafter called a handprint ISR system), and also capable of maintaining pixel images so as to integrate these multiple forms of data and images. Thus, the present invention is an information processing system that extracts data recorded on documents by use of automated symbol recognition means and devices to handle and merge pixel images.

BACKGROUND ART

Optical mark scanning apparatus (hereinafter referred to as optical mark reading or OMR systems) are well known in the prior art. There are a wide variety of applications that use OMR systems and scannable forms in the large-scale gathering of discrete pieces of information recorded on documents (e.g., scores from standardized tests, census information, preference surveys, etc.). OMR systems generally sense data recorded with marks containing pigment that absorbs light in the near infrared (NIR) range (e.g., marks from a No. 2 pencil or other marker containing graphite or other form of carbon) in specific, predefined fields on a form. Such data are position-encoded, in that their meaning is interpreted based on where the data has been marked on the form document used to record it. This is called NIR-mode scanning. A primary advantage of NIR-mode scanning (or other scanning based on limited spectral responsivity) is that it allows separation of the respondent-marked variable data from the standard background printing on the same document.

Although a more recent development, visual image scanning apparatus (hereinafter referred to as VIS mode scanners or VIS systems) are also well known in the prior art. Most of the applications for current VIS systems have developed out of the desire to find replacements for traditional microfilm image capture systems. As a result, the focus of current VIS systems is on the acquisition of the total scanned image of a document, as compared to the detection, dark mark resolution and processing of discrete pieces of information recorded in predefined fields done by current OMR systems.

One of the limitations with current OMR systems that focus on predefined fields is their lack of any ability to scan or reproduce the context of a scannable form surrounding the predefined fields. As a result, the retrieval and viewing or hard copy replication of the stored or archived discrete, raw information from a form scanned by an OMR system is of limited value, because there is no capability for interpreting that information without resorting to the form, a transparent overlay or even a booklet associated with the form, as is the case in standardized testing.

VIS systems, on the other hand, are capable of reproducing the entire contents of a scannable form (both standard background printing and any variable data) as a digitized, pixel image, but any associated OMR processing logic cannot easily interpret or analyze any of the discrete, variable information contained in a VIS-mode pixel image of the form. A great deal of digitized data both fixed and variable, can be collected by VIS images, but the meaning of the variable data remains to be extracted and not all of the VIS-mode data collected may be of interest. For example, if an $8\frac{1}{2}'' \times 11''$ piece of paper is scanned at a resolution of 120 dots per inch (DPI), vertically and horizontally, and with an eight-bit grayscale range, more than 1.3 megabytes worth of bit-level scanned information may be generated from this single page. Obviously, a tremendous amount of computer processing power may be necessary to extract and analyze significant bit-level information or even localized pixel segments (often called regions of interest or areas of interest (AOI's) from a form scanned with a VIS system. Moreover, the storage requirements for storing all of this information in a situation where hundreds or thousands of documents are being processed to capture a complete pixel image as a by-product of capturing the variable data is so large as to be prohibitively expensive in most applications.

One approach that has been used to reduce the amount of data that must be stored when documents containing text and/or numbers are VIS scanned is to use symbol recognition systems (usually computer-based) to convert the visual image of text and/or numbers into more-compact, character-based alphanumeric data. The latter requires far less memory for storage and has the further advantage that it can be used as an input file for a word processing program, a text search program, or a variety of other software for manipulating files consisting of text and/or numerical data.

The manner in which information is recorded or encoded on a document is, in the present state of technology, highly determinative of the speed and accuracy with which computer-based systems can extract the information and convert it into digital form. Present technology offers no very effective way of converting text that is handwritten in script into digital form. Handprinted information can be interpreted and converted into digital form with some degree of success, particularly if the symbol recognition processor is highly adaptive, such as a neural network. This task is easiest when the information involved is numerical, because this sharply reduces the universe of characters to be recognized. Other forms of encoding information permit symbol recognition and conversion into digital data with greater ease. Bar code recognition is now an advanced art and widely used to identify products in manufacturing, distribution and sales. Optical character recognition of certain printed fonts is also advanced to the point where speedy, accurate translation from printed information to digitally-stored alphanumeric data is possible. OMR scanning, mentioned above, is a further highly developed art that permits rapid translation of position encoded data from document form to character-based alphanumeric form.

Having all these options before them, persons who wish to collect information by having it recorded on documents now have the ability to design a document that combines one or more of the above forms of data representation. To the extent that the document incorporates several different forms of data representation, new problems are raised concerning how the documents can rapidly be converted into character-based data by automated means. Moreover, to the extent such a document permits some data to be recorded by hand marking or hand writing, some recorded information will be ambiguous under the criteria defined by the automated symbol recognition systems employed to interpret the information (e.g., faint OMR marks, heavy smudges or erasures, badly reproduced OCR font print, careless hand printing) and other recorded information will be either beyond the capacities of the available symbol recognition technology (e.g., handwritten script entries) or may only have significance in its full, undigested, visual form (e.g., a signature or a sketch).

What is needed is a document scanning system and method that permits information encoded in a wide variety of ways to be efficiently processed so as to extract the desired information, where possible, in character-based alphanumeric form, while preserving the option to retain all or portions of such information in "electronic-image" visual form for examination by a human operator.

SUMMARY OF THE INVENTION

The present invention is an image processing system that is capable of managing scanned images captured from both NIR-mode scanning apparatus and visual image scanning apparatus and of employing various symbol recognition resources to extract information recorded on documents and encoded in a variety of different forms and convert it to character-based alphanumeric data or store it as a digitized image.

It is an objective of the present invention to provide an image processing system that is capable of managing scanned images captured from both optical mark scanning (NIR mode) apparatus and visual image (VIS-mode) scanning apparatus.

It is another objective of the present invention to provide an image processing system that is capable of extracting scanned images from predefined areas of interest on documents scanned and utilizing a variety of symbol recognition devices to translate the scanned information from pixel format images into alphanumeric data in character-based form, so as to provide an integrated output record to a digital information processing system.

A further objective of the present invention is to provide a means of capturing information from a document marked with response that sharply reduces the amount of computer storage needed to store all information of significance on the document as compared to a non-compressed, full, pixel-by-pixel image of the document.

A still further objective of the present invention is to provide an efficient system for extracting information from form documents containing response information encoded in a variety of encoding schemes.

These and other objectives of the present invention will become apparent with reference to the drawings, the detailed description of the preferred embodiment and the appended claims.

DESCRIPTION OF THE DRAWINGS

FIG. 3 is a plan view of a sample form document such as can be processed effectively by the present invention, containing the printed material common to all copies of the form document and certain additional information printed on the form for automated processing.

DESCRIPTION OF THE PREFERRED EMBODIMENTS

Figure 1:
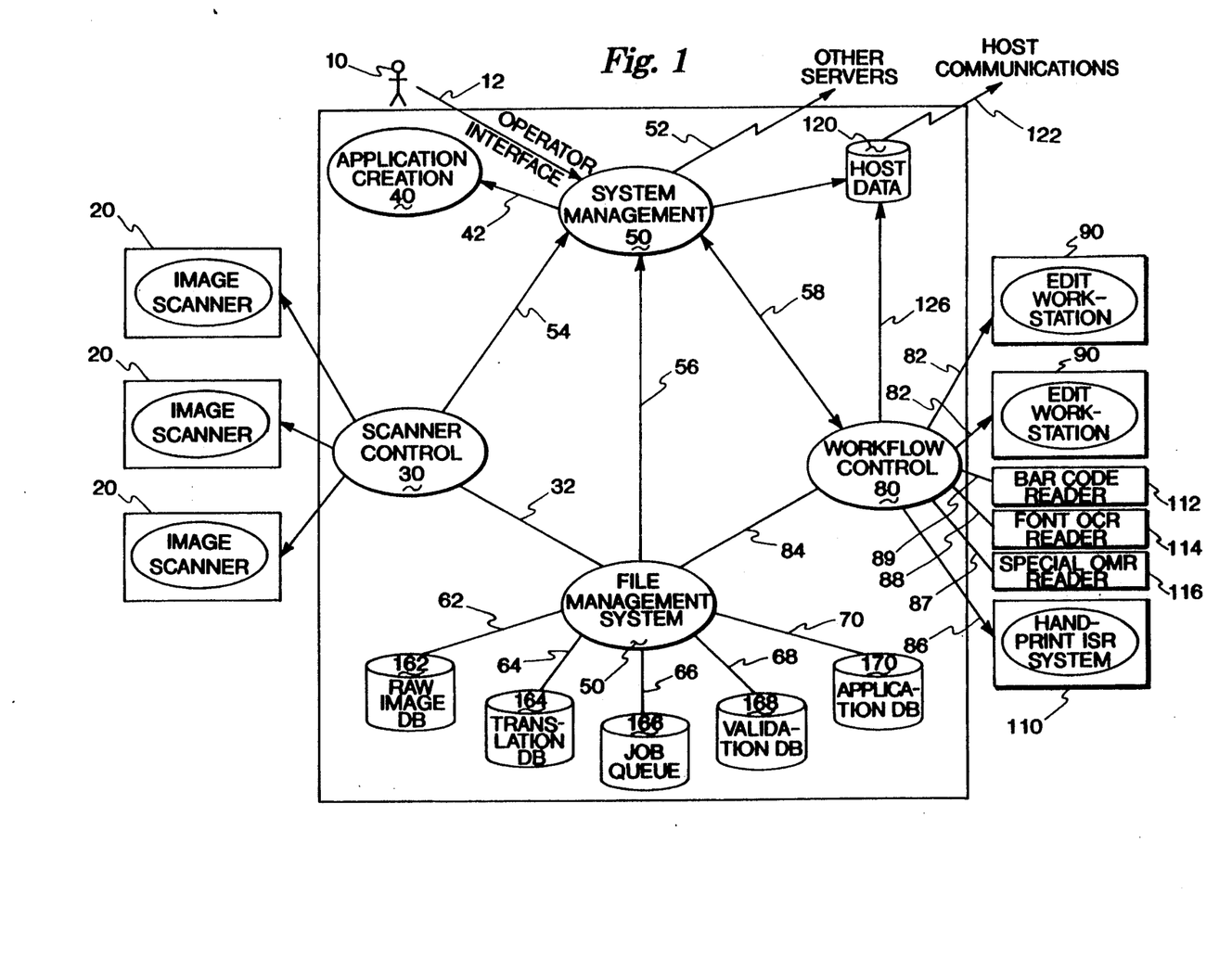
FIG. 1 is an overall function block diagram of the image processing system of the present invention.

FIG. 1 shows a function block diagram of the various elements of the present invention. Most of the functions of the invention are performed in a server 100 that is a data processing system consisting of a UNIX-based server with several gigabytes of disk storage or other equally fast secondary storage. Residing in the server 100 is software that includes a scanner control module 30 that controls the operation of and receives data from up to three optical scanners 20 via communication channels 22. Also residing in the server 100 is the application creation module 40 that permits a wide variety of document-specific scanning and processing tasks of the type described below to be developed.

A system management module 50 is connected to the application creation module 40 by a channel 42. An operator interface 12, consisting of a communication channel 12 and an operator display (not shown in FIG. 1) permits an operator 10 to monitor the server 100 and intervene in the usual control situations encountered by a complex data processing system. Channel 52 connects the system management module 50 to other servers (see FIG. 2). Channel 56 connects the system management module 50 to the file management system 60. The file management system 60 interfaces with a number of files, the functions of which are described in greater detail below: raw image database file 162 via channel 62; translation database 164 via channel 64; job queue file 166 via channel 66; validation database 168 via channel 68; and application database 170 via channel 70.

Channel 58 connects the system management module 50 to the workflow control module 80. The workflow control module 80 governs the flow of work to a handprint ISR system 110, which is one of several automated symbol recognition resources used in the present invention. This particular automated symbol recognition resource is, under the present state of the art, so complex that it is preferably implemented in the form of an outboard hardware-software device. The other symbol recognition resources employed by the preferred embodiment of the present invention include: a bar code reader, an optical mark reader, and a font OCR reader. These can be implemented in software resident on the server 100. Alternatively, the OMR reader for standard optical mark data can be incorporated in a scanner 20 and, as shown in FIG. 1, outboard bar code reader 112, font OCR reader 114 and special (non-standard) OMR reader 116 can be connected to workflow control module 80 by channels 87, 88, 89, respectively. Although in the preferred embodiment the handprint (ISR) system 110 is capable of reading all alphanumeric characters, depending on the requirements of the system and cost issues, a somewhat less sophisticated reader of only handprinted numeric data could be employed or a reader of only handprinted alphabetic data. Also connected to the workflow control module 80 are one or more edit workstations 90 via channels 82. Channel 84 connects the workflow control module 80 to the file management system 60, so that the workflow control module 80 can access information obtained by the scanner control module 30 and information stored on the various files connected to the file management system 60 for delivery to the handprint ISR system 110, bar code reader 112, font OCR reader 114 and special OMR reader 116 or to an edit workstation 90.

A host data file 120 connected to the system management module 50 via channel 124 and to workflow control module 80 via channel 126 is used to assemble output records for delivery to a host system (not shown) via host communications channel 122. The output records constitute a primary final product of the present invention. As will be described in greater detail below, the output records will consist of information in character-based alphanumeric format or pixel image format that the server 100 extracts from the documents scanned by the scanners 20. The pixel images of documents produced by the scanners 20 are processed in accordance with the present invention so that most pixel data are interpreted in automated or semi-automated fashion to convert the pixel images of the documents into usable, character-based alphanumeric records while some pixel data remain in image form.

The present invention is suitable for extracting data from documents containing information encoded in a variety of optically scannable formats. Any kind of data may be involved. The most suitable situations for the use of the invention are data collection situations in which a high volume of data is to be collected and processed and in which a form document can be used to guide the collection of information. Typically, information is collected from a respondent who reads the form document or a booklet associated with it and marks or writes response indicia of various kinds on the form document. All respondents are given essentially the same document, although the individual forms given to each respondent may contain variable information used to identify the particular respondent, or perhaps a subset of the respondents, or some circumstance that is unique to a respondent.

Figure 2:
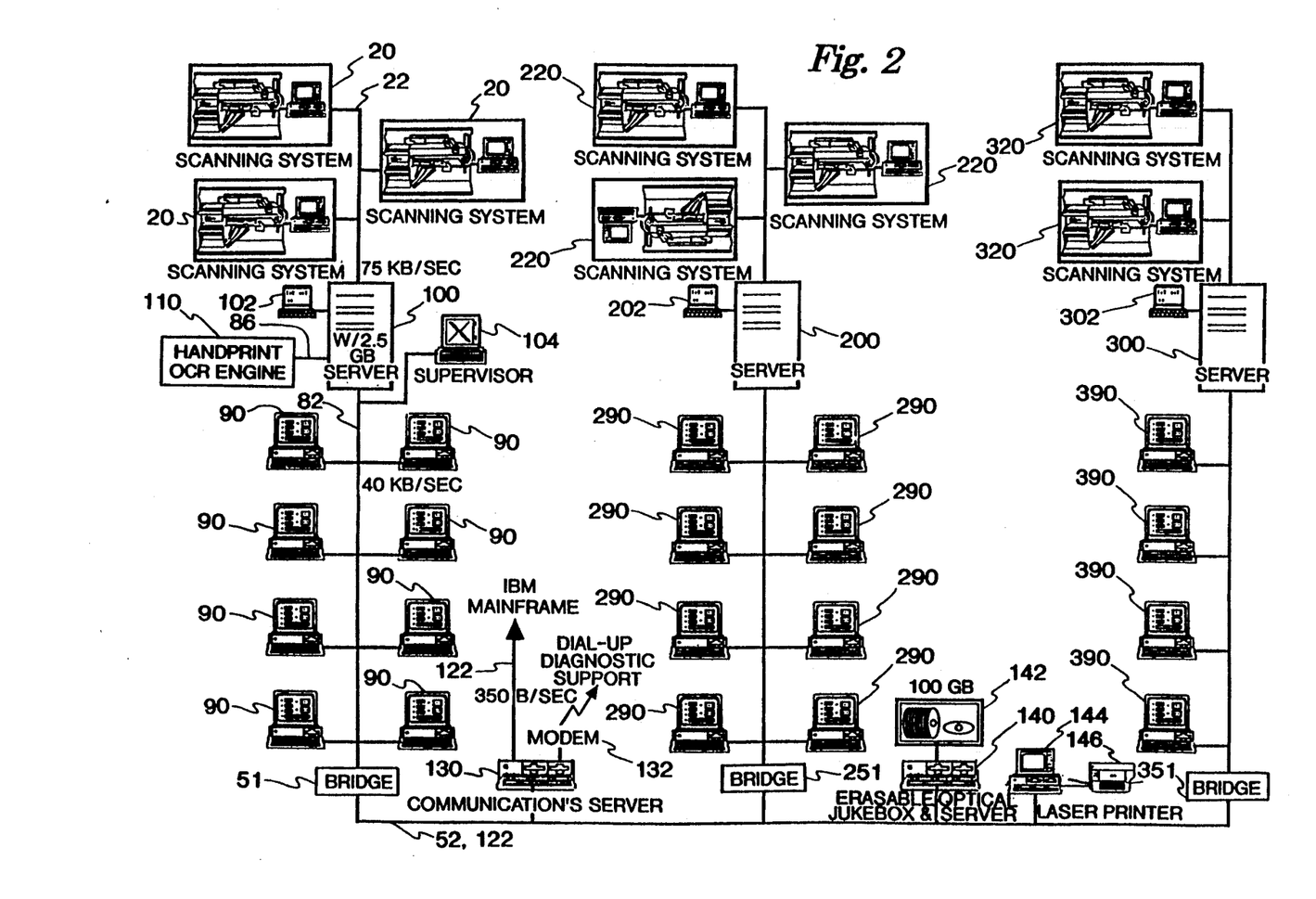
FIG. 2 is a schematic pictorial diagram of the present invention as incorporated into a network.

FIG. 2 shows a schematic pictorial diagram of the present invention as incorporated into a high-speed network (e.g., Ethernet). In FIG. 2, as in FIG. 1, the server 100 is connected to three scanners. A server console 102 and a supervisor terminal 104 are also connected to the server 100. Multiple edit workstations 90 are connected to the server 100. A bridge 51 connects the server 100 to a communications server 130, which, in turn, is connected to a host mainframe via a channel 122 and connected to a modem 132 that can be used to provide dial up access to the system for diagnostic support.

Line 52 connects the server 130 to another bridge 251 leading to a server 200. Server 200 is essentially the same as server 100, and has the corresponding elements in its network labeled with the same reference numbers as the corresponding elements for the server 100, but with a prefix "2". Thus, the edit workstations 290 connected to server 200 correspond to the edit workstations 90 connected to server 100. Line 52 also leads to another server 300, with references numbers again showing the correspondence with like elements of the network for server 100, except that a prefix "3" is used. Also connected to the line 52 leading to the server 300 is an erasable "jukebox" type storage device 142 with its own server 140 to be used for mass storage for archiving or other purposes.

FIG. 3 is a plan view of a form document 400 designed to be processed effectively by the present invention. Form 400 contains the printed material common to all copies of the form document and certain additional information printed on the form for automated processing. The form document 400 of FIG. 3 demonstrates the various capabilities of the present invention. It represents a typical document that might be used to obtain information from a population of numerous respondents, in this case subscribers or potential subcribers to a fictitious periodical called "PC News". Each subscriber receives the same form document 400, except that the form each subscriber receives has certain information identifying the subscriber (name, company, address, etc.) printed in the upper left hand corner (area surrounded by broken line labeled 410).

The form document 400 of FIG. 3 has some of the characteristics of a typical form response document designed solely for OMR scanning. That is, along the right hand margin it has the customary column of marks 402 that serves as a timing track and across the lower edge margin it has a contrast calibration bar 404. All printing visible on the form 400, with the exception of the contrast calibration bar 404, timing track 402 and the printing contained within the area labeled 410 is printed in an ink color that is easily visible to a human reader, but contains no carbon or other material that absorbs light in the near infrared range or that is detectable in an NIR-mode scanner. The printing ink for contrast calibrator bar 404, timing track 402 and the printing within the area labeled 410 contain graphite or another material that makes it absorb light in the near infrared range. (Triangulation marks used to correct skew and for other alignment purposes described in greater detail in the related application identified above would also be printed in NIR light absorbing ink.) Thus, when form 400 as it appears in FIG. 3 is scanned by a scanner operating in NIR mode, in the resulting pixel image it appears to be blank except for the timing track 402, contrast calibration bar 404 and the print in area 410. On the other hand, when the form 400 as it appears in FIG. 3 is scanned by a scanner operating in the VIS mode, all print appearing in FIG. 3, (with the exception of the reference numerals and the broken lines used to identify areas associated with reference numerals, which are artifacts of a patent drawing) will be found in the pixel image resulting from such VIS scanning.

As can be seen, the form 400 contains first indicia (all printing except for the timing track 402, contrast calibration bar 404 and the print in area 410) detectable in a scan mode using light in a first spectral range, in this case the visible light range, but not detectable in a second scan mode using light outside the first spectral range, i.e., in a second scan mode using near infrared light. Form 400 also contains second indicia (the timing track 402, contrast calibration bar 404 and the print in area 410) detectable in either said first or second scan mode. As will be explained in greater detail below, it is this ability to separate information contained on the surface of a form into two classes based on the ink types and spectral responsivity of the scanner used that leads to many of the advantages of this invention.

Figure 4:
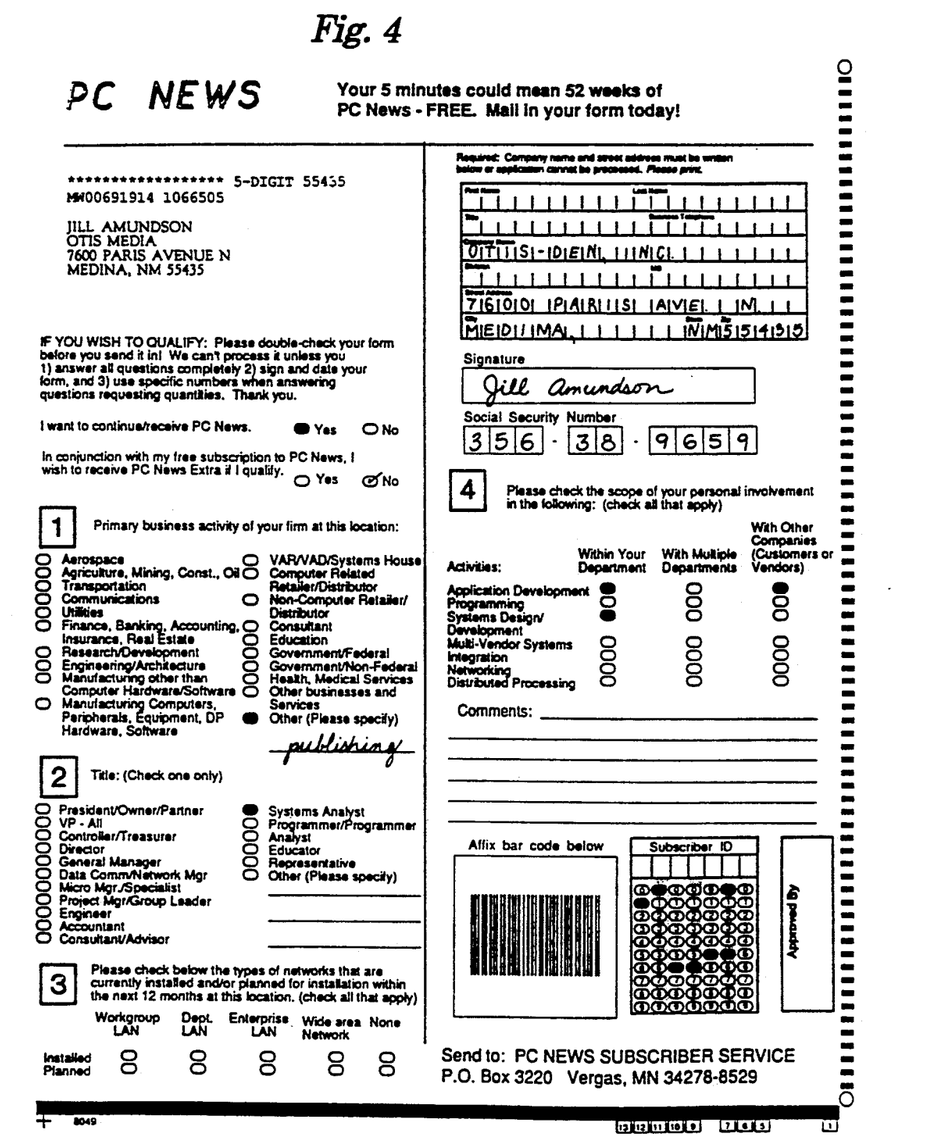
FIG. 4 is a plan view of the sample form document of FIG. 3 which has been marked with responses constituting information that the present invention is designed to extract.

FIG. 4 shows the same form 400 as in FIG. 3, except that the form 400 in FIG. 4 shows the marks, writing and other information placed on the form by the person responding to it. As can be seen, the respondent has: made marks in a number of response bubbles, written script responses in certain free-form response areas, printed various letters and numbers in defined response areas and affixed a barcode label to an area. The recipient of this response-marked form 400 desires to extract the response information by automated means, with the opportunity for human editing to check the results of automated processing by the various intelligent symbol recognition resources identified above and to intervene when the automated processing is unsuccessful in obtaining the information it seeks and therefore is unable to deliver character based alphanumeric data representative of the information to be decoded.

The first step in using the present invention to extract information from a form response document such as that shown in FIG. 3 is to define the application-specific processing required. Applications are defined to focus on one or more scannable documents which under some logical grouping form a single unit of input for the scanning system. Form 400 represents a unit consisting of a single page. A multipage test booklet or order form to be completed by one respondent is a unit consisting of a plurality of pages. The application definition includes specification of machine-readable document identification symbols and registration requirements as well as document sequence rules. These allow a scanner 20 to recognize whether it has documents that correctly fit the scanning procedures defined for the application and to recognize closure of a single scanning unit. The application also defines what are called areas of interest (AOI's). An area of interest may be any area on the surface of the 400. (While for some applications both the front and rear surfaces of a form document will be used, for clarity of explanation of the present invention, the following discussion of form 400 assumes that it has it first and second indicia printed on only one surface, that being the surface shown in FIGS. 3 and 4.)

The application definition also defines the objects of interest within the application ("objects"). Objects are typically associated with logically grouped output data. For example name, address, question No. 2, and social security number are each objects on a document which represent some set of meaningful data. A single object may give rise to several AOI's on the document. To resolve the address object on form 400, for example, the system will need to interpret the regions on the form 400 that contain street address, city, state and zip code which, for efficiency or delineation, may all have unique AOI's. Therefore, objects may be defined as a composite of AOI's on the document, with processing resources defined for each AOI as well as having one or more components of output. Output can be defined for each object as to form and structure. Output for a name object may consist of four fields: first name as ASCII, last name as ASCII, middle initial as a single character of ASCII and the image of the signature itself. These fields are defined in terms of size and sequence in order to form a consistent usable structure for an output record for further processing.

All of the rules and other information involved in defining an application is stored in application database 170 and/or translation database 164 and/or validation database 168.

FIG. 3 shows a number of AOI's defined by the broken line boxes in FIG. 3. (These broken lines could be printed on the form 400 in ink detectable only in the first scan mode, but they are not meaningful to the respondents and normally do not appear on the form 400). AOI 410 defines the area in which some subscriber/respondent specific information is printed in a font that can be "read" or decoded by a font OCR reader. AOI 420 encompasses two yes-no questions, each with two corresponding OMR response areas or "bubbles" to be marked by the respondent. AOI's 430 and 440 each include multiple OMR response bubbles corresponding to a number of selections the respondent may make. Each AOI 430, 440 also has associated with it a contingent response area 435, 445 that permits a free-form entry of information by the respondent. The last OMR response bubble in each of the AOI's 430, 440 requests the user to indicate that a free-form entry is included on the lines appearing with the AOI's 435, 445. AOI 450 is a grid form response area containing OMR response bubbles at the grid intersection points. AOI 460 requests the respondent to insert printed letters and numerals one-by-one in single spaces of equal size. This guided form of response field makes the resulting response marks much easier for the handprint ISR system 110 to "read" or decode the markings. AOI 470 is for a signature that will normally not be subject to any processing by an automated symbol processing resource. Instead any signature will simply be stored as a pixel image. AOI 480 is similar to AOI 460, except that only numerals will be entered by hand printing in the predefined spaces. AOI 490 is much the same as AOI 450, again having response bubbles in a grid pattern, any one or more of which may be marked. AOI 500 is an open-ended, free form response area that can be expected to contain a handwritten script response not readable by present handprint ISR systems. Accordingly, this AOI, like the AOI 480 for the signature, may lead to the storing of a pixel image of the entire area in which writing occurs, if any handwritten comments appear. AOI 510 is an area in which a preprinted bar code from a label or other source is to be inserted. This AOI 510 will be processed by a bar code reader. AOI 520 contains a mixture of OMR bubbles and predefined areas for handwritten numerals, which, if both areas are correctly filled in, will contain the same information.

Figure 5A:
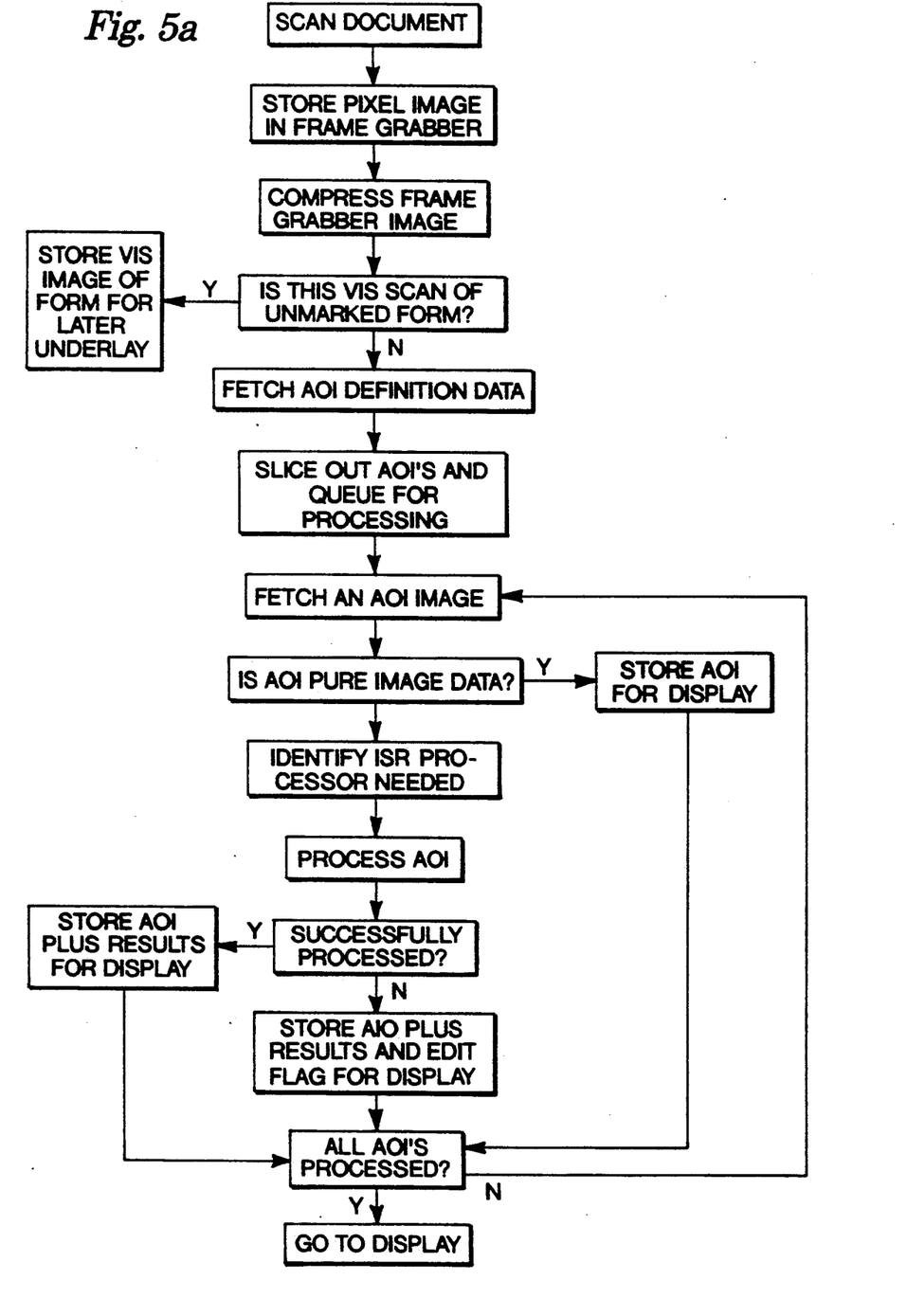
FIGS. 5a and 5b are flowcharts showing the method of the present invention for processing a response-marked form document such as in FIG. 4.
Figure 5B:
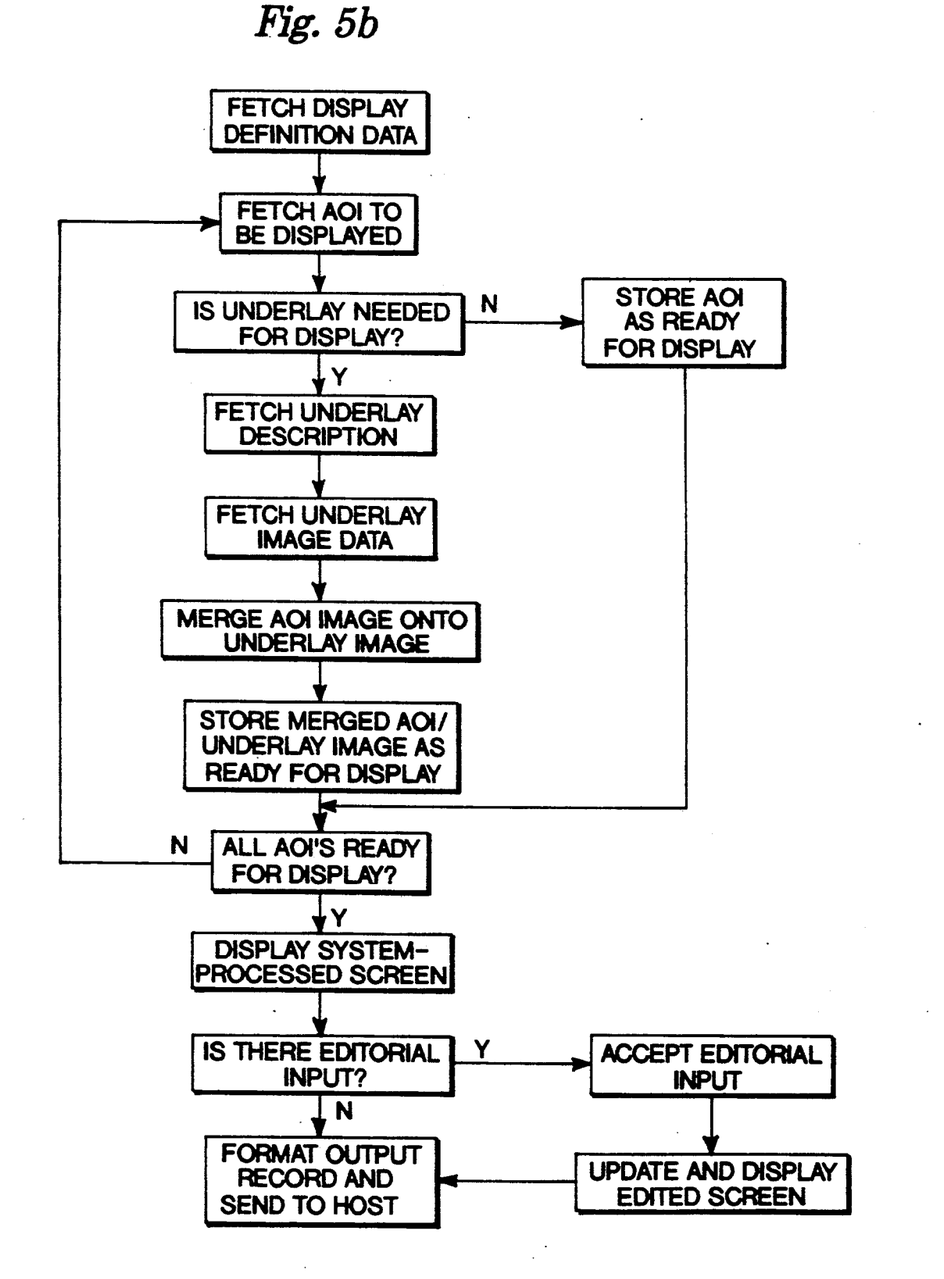

FIGS. 5a and 5b contain flowcharts that describe the overall processing flow for the present invention. The various logical steps and operations specified by the flowcharts are executed by the server 100 utilizing the scanners 20, edit workstations 90 and the ISR resources 110, 112, 114, 116. The scanners 20 will be scanning in either the VIS mode when they are capturing the information present on an unmarked form 400 or in the NIR mode when they are capturing markings on a response-marked form 400. In the preferred embodiment, each scanner is able to scan in either mode and can change from one mode to the other under the control of the scanner control module 30. In less sophisticated systems, it would be equally acceptable to have one scanner 20 dedicated to VIS mode scanning and others dedicated to NIR mode scanning. All that is necessary is that the control logic receive some signal indicating the scan mode that is operative.

When a document is scanned, the scanner 20 places a full, uncompressed, raw pixel image in suitable temporary storage, usually a "frame grabber" that is part of scanner 20. The pixel image in the frame grabber is preferably compressed using one of several conventional lossless compression techniques known under the names "Runlength", "Huffman" or "LZW". If this is a VIS scan of an unmarked form document (which may, nevertheless contain some data that is specific to that particular copy of the form document, such as the respondent identification information in AOI 410), then the compressed pixel image will not be processed by any automated symbol recognition resource. Accordingly, the pixel image is simply stored in a disk file or other long term storage for later use in a merge operation involving variable data from an NIR scan, in which the VIS scan pixel image will typically be used as an underlay. If this is an NIR scan, then the scanner 20 will again place a full, uncompressed, raw pixel image in a suitable temporary storage, such as a frame grabber, and the stored image will preferably undergo compression before it is stored in a longer term data file.

Because the NIR scan picks up only marks or printing that absorbs light in the near infrared range, a great deal of what appears on the form 400 is not picked up in the resulting pixel image. That is, ink for the typical preprinted information appearing on the form is invisible in the NIR scan, and areas printed in this ink appear as white space surrounding a limited amount of darker response marks. Because the amount of such white space compared to the darker response marks is very large in most applications, the compression that can be obtained is quite dramatic. Further compression is available if the only portions of the NIR scan pixel image are certain defined AOI's, if these AOI's include less than essentially the full surface area of the document, or if a content test is performed for each before it is accepted for storage to determine whether any mark at all is present. The particular content test used varies according to the type of information encoding used. For example, for OMR data, content would be found to exist only when some OMR bubble within the AOI had appreciable grayscale content. For bar code data, a meaningful bar code pattern would have to be present. For an AOI defined to contain handprint, a meaningful aggregate grayscale density would have to be exceeded. In some applications, e.g., an order form with an extensive listing of product choices, each product could be defined as an individual AOI but only those AOI's that actually contain order information would be stored for later processing.

Whether all AOI's defined or only defined AOI's that actually contain markings are stored, a queue of AOI's is constructed for further processing. As noted above, each AOI has associated with it at the time it is defined the type of automated symbol processing resource, if any, that should be used to decode the response information marked in the AOI. As each AOI is removed from the queue for processing, the pixel image corresponding to the AOI is passed to the automated symbol processing resource that is specified for that AOI. If an AOI in the queue is not susceptible of automated symbol processing, then it is simply stored for later display. For each AOI that is passed to an automated symbol processing resource, a string of character-based alphanumeric data will be produced. In the preferred embodiment, the automated symbol processing resource also passes back a status code of some kind (such as an edit flag), indicating whether it was able to successfully process the pixel image it was assigned to process. If difficulty was encountered in processing (e.g., an OMR reader encounters a light OMR mark that leads to a grayscale value defined to be ambiguous or the handprint ISR system is unable to resolve a printed letter that deviates too much from the norm), then human editorial intervention will be desired and the alphanumeric character-based data results produced by the automated symbol processing resource may need correction or completion. Whether the edit flag is raised or not, the results of processing of each AOI by the assigned automated symbol processing resource become associated with the pixel image of the AOI for display purposes, discussed next.

In sum, when a document is scanned, the scanner 20 captures the entire image of the front and back surfaces of the form as uncompressed 8-bit per pixel data. The AOIs on the form are analyzed for content and interpreted according to the application definition associated with the form. At this stage, AOIs may be interpreted by the scanner 20 as being OMR response bubbles, regions having handwritten response or image clips. In an embodiment where the scanner 20 is sophisticated and provided with ample processing power, the scanner 20 will also interpret AOIs using its own font OCR and bar code reading resources, and other symbol processing resources. When the scanner 20 has identified and resolved the meaningful data from the form, it passes this data to the scanner control module 30. This data can consist of ASCII coded characters, compressed or uncompressed images, or a representation of a raw OMR grid.

Work flow control module 80 is built on the idea that objects are generated by the scanning process that need to be processed by some ISR resource and the output record for an instance of the application (e.g., a response-marked copy of form 400) needs to be produced upon successful interpretation of all objects associated with that instance. Work flow control is a two stage process. The first stage manages the system resources so as to monitor system processing resources e.g., CPU, disk storage, etc. In the preferred embodiment, the first stage starts and controls second stage processes which gather and interpret the objects for a single unit of the application. The second stage process is responsible for resolving the objects, if so capable, or routing the objects to appropriate ISR resources, i.e., font OCR reader 114, bar code reader 112 or to an edit workstation 90 for human visual verification. The content of the display for human visual verification is determined by display definition data that is part of the application definition.

When the automated symbol processing resources have performed all the processing work on the AOI's in a queue of AOI's developed from a document scanned in NIR mode, the results can be formulated directly into an output record containing the essential information that was to be extracted from the document scanned for transmission to a host computer (not shown). This record, which constitutes a translation of the markings on the response-marked form into strings of alphanumeric data and may also include images, is ready for processing by whatever host application programs have been devised to accept and further process the information. In most applications, accuracy of the output records as faithful translations of the response-marked forms will be highly important. Accordingly, the present invention allows displaying the information obtained as a result of processing some or all AOI's on a document on an edit workstation 90 for any necessary editorial intervention.

Figure 6:
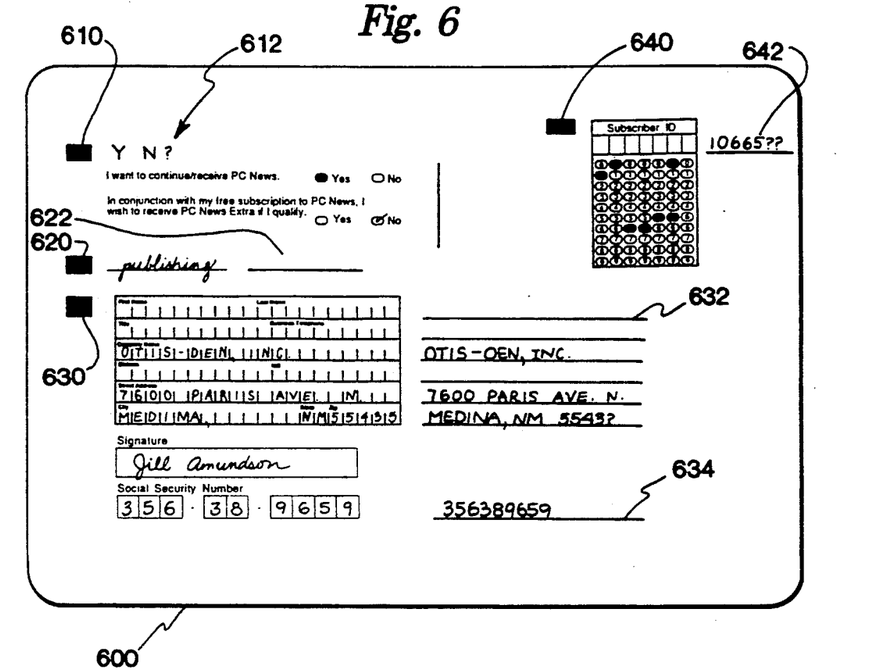
FIG. 6 is a representation of a screen display as generated by the present invention after scanning of the response-marked document of FIG. 4 and processing the defined areas of interest with the automated symbol recognition resources available in the present invention.

Turning to FIGS. 5b and 6, the operations for formulating a display screen 600 for an edit workstation 90 and the layout of such a screen are shown. The edit screen image in FIG. 6 is the result of processing the AOI's of FIG. 4 and displaying selected AOI's. Each displayed AOI has associated with it a location or tab symbol 610, 620, 630, 640 to which the operator can tab when the operator wishes to work on a particular AOI. With each tab symbol is displayed an image that includes both first indicia, obtained from the VIS scan, and second indicia, obtained from the NIR scan. These have been merged to make one image in the manner described below. AOI 410 is not displayed on the edit screen 600, on the theory that it was not prepared by the respondent and that font OCR translation into character-based data is highly reliable. (Moreover, check digits may be added to the font OCR text for further enhancement of accuracy.) Accordingly, the alphanumeric translation of this information goes directly into the output record for this document. AOI 420 is displayed (tab symbol 610) on edit screen 600, because the OMR reader considered the check mark by the second "No" to be potentially ambiguous, due to the small amount of darkening within the response bubble. Displayed by the server 100 just above the image of AOI 420 are the letters "Y N?", representing the decoding work of the OMR reader and its conclusion that the check mark is an ambiguous marking that may need editorial intervention.

AOI 435 is also displayed (tab symbol 620) on edit screen 600. Its display is caused by the OMR reading of a mark in the last response bubble in AOI 430, denoting the selection of "Other (Please specify)". Thus, the image of AOI 435 shows the respondent's script entry of the word "publishing", which could not be translated by any automated symbol processing resource. To permit the operator to translate the script entry to make it part of the output record, the server generates a blank line 622 that is part of the edit screen 600 and thereby prompts the operator to type in the word "publishing".

At tab symbol 630 on edit screen 600 AOI 460 is displayed. Juxtaposed with the image of AOI 460 is a multiline display 632 generated by the server 100 containing the alphanumeric data developed by the handprint ISR system to which the pixel image of AOI 460 was passed for translation into character-based data. As can be seen, the display 632 contains three blank lines (first, second and fourth), where the respondent entered no data and attempted alphanumeric translation of the third, fifth and sixth lines. From this display the operator should be able to observe that there is a translation error in the third line, where handprinted "DEN" has been translated "OEN", probably because of the carelessly formed "D". Also, the operator will note that the final digit of the zip code is translated as a "?", prompting the operator to read the carelessly handprinted "5". The operator can then edit the text at display 632 to make the necessary corrections. The blank lines may be handled in several different ways, depending on how the application is defined. The operator could be prompted to call up a display of AOI 410 to transcribe what appears there onto the blank lines. Alternatively, the operator could simply command the system to enter the translated alphanumeric string resulting from the font OCR reader reading AOI 410 onto the blank lines in display 632, on the theory that most respondents will leave blanks for those lines that seek entry of the information already correctly printed in AOI 410.

At tab symbol 640 in edit screen 600 is displayed AOI 520, which could not be successfully processed by the OMR reader. (Because the response area includes an OMR grid, which usually is correctly filled in, the area above the OMR grid for handprinted entry of the same seven numerals to be coded in the OMR grid was not passed as a pixel image for processing by the handprint ISR system.) The operator can easily see that the final two digits could not be decoded by the OMR reader, because the response bubbles for both the "0" and the "5" were marked in the next-to-last column of the grid. Again, the server-generated string "10665??" prompts the operator to read the handprinted numerals and to type in the last two digits, based on the assumption that the handprinted numerals are correct, even though they differ from the marks made in the response grid bubbles.

Although FIG. 6 shows a varieyt of AOI's in the form of merged images, incorporating information from both the VIS-mode and NIR mode scans, this is not always necessary. The merged images make the displayed data recognizable, but there are other methods. If the application causes the server 100 to develop labels for screen display 600, these could be used to aid the person viewing the display in identifying the AOI displayed, should the displayed information not be self-explanatory.

While the use of the NIR mode scan provides a particularly efficient way of separating the variable data recorded on a form from the background printing, this separation can be performed in other ways. If it were desired to use VIS-mode scanning only, the AOI's could be specified by location and evaluated by use of a background template so as to reduce the effect on any background printing. This approach could be used to separate the pixel image of variable data contained within an AOI from the background printing that would be part of the same pixel image. With this type of system it would usually still be desirable to separately scan a "blank", unmarked copy of the form to provide a clean background underlay image for any merged images created by overlaying the background with the variable data captured in an AOI.

Figure 7:
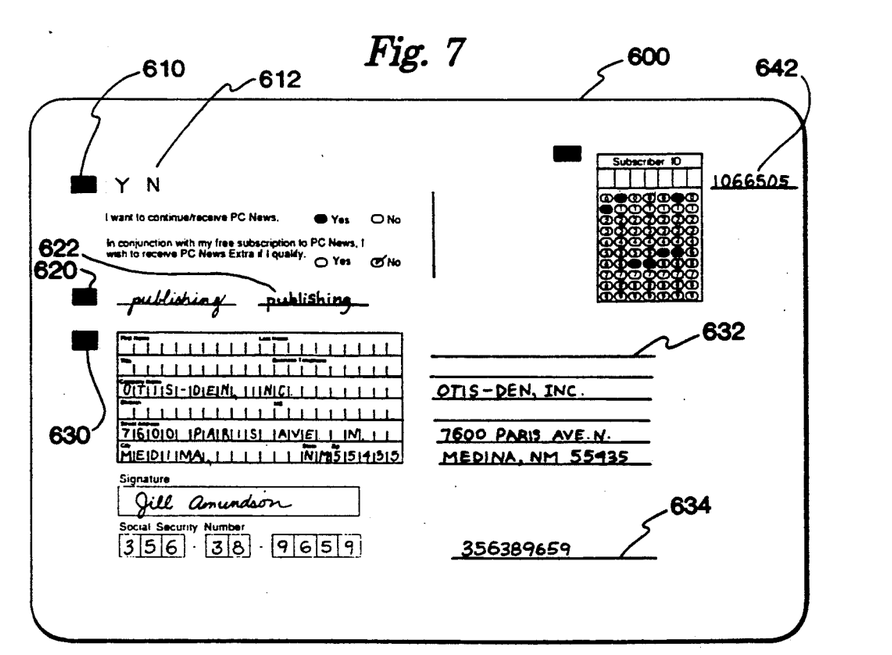
FIG. 7 is a representation of a screen display as in FIG. 6 after the editorial intervention of a human editor to prepare an output record incorporating information extracted from the response-marked document of FIG. 4.

FIG. 7 displays the edit screen 600 after all editorial intervention. The corrections and additions allow the output record for the document to be completed and made ready for storage in the host data file 120 for later transmission over channel 122 to the host computer (not shown). At the host, a subscription order can be printed and processed, a letter printed thanking the respondent for his/her response and notifying him/her that he/she qualifies for a subscription, or performing whatever other operations are desired.

Another application in which the present invention would be very useful is in processing order forms or booklets. In that application, the order form filled out by a customer or by a company representative dealing with one or more customers is scanned to identify the products ordered and the number ordered, the party ordering, shipping addresses, payment details, etc. In such an application, formulation of the output record could also involve validation of information obtained by processing various AOI's by automated symbol processing resources. For example, if a customer provided a customer number that would lead to a grant of credit, the number could be checked against a list of valid customers numbers kept in validation database 168, which might also contain customer name information or address information that could be used for additional cross-checking. In such an application, extensive use of translation database 164 could also be made. For example, if OMR entries resulted in a product number, this product number could be translated into a product name or description that could be included in an output record instead of or together with the product number.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

What is claimed as new and desired to be protected by Letters Patent is:

1. A method for extracting information from a document bearing first indicia detectable in a first scan mode using light in a first spectral range but not detectable in a second scan mode using light outside the first spectral range and bearing second indicia detectable in either said first scan mode or second scan mode, said second indicia representing information encoded in a plurality of encoded forms, each encoded form decodable into alphanumeric data by one of a plurality of automated symbol recognition resources, said method comprising the steps of:
    (a) defining at least two areas of interest on said document, each comprising less than the entire document, in which said second indicia may appear, said definition for each area of interest including information specifying the form of encoding for said second indicia and a content test corresponding to the form of encoding to determine if any second indicia in the specified form of encoding are present in the area of interest;
    (b) scanning said document in said second mode, using a scanner that produces a pixel image of the second indicia detected, said pixel image excluding said first indicia;
    (c) storing the pixel data obtained from step (b) in a memory device;
    (d) selecting one or more areas of interest from those defined for said document, applying the content test defined for the area of interest and, if the content test is satisfied, processing the pixel image of said area of interest with one of said plurality of automated symbol recognition resources suitable for the form of encoding specified for the second indicia in the selected area of interest; and
    (e) producing one or more output records incorporating alphanumeric information representative of the second indicia in said plurality of areas of interest produced by the processing of step (d).

2. The method of claim 1 further comprising the step of transmitting a pixel image of each area of interest containing said second indicia to a visual display for editorial intervention.

3. The method of claim 1 wherein the step of selecting and processing an area of interest comprises processing with an automated symbol recognition resource selected from the group consisting of: a bar code reader, an optical mark reader, a font OCR reader, a reader of handprinted numeric data and a reader of handprinted alphanumeric data.

4. The method of claim 1 further comprising the steps of:
    (f) scanning a copy of said document containing only said first indicia in said first mode, using a scanner that produces a pixel image of the first indicia detected; and
    (g) storing the pixel data obtained from step (f) in a memory device.

5. The method of claim 4 further comprising the step of transmitting a pixel image of at least one area of interest containing said second indicia to a visual display for editorial intervention.

6. The method of claim 5 further comprising:
    for said at least one area of interest to be transmitted to the visual display, performing a pixel-for-pixel merge of the pixel image of steps (b) and (f) to produce a single merged pixel image containing both first and second indicia within said at least one area of interest.

7. The method of claim 6 further comprising:
    (h) determining whether the automated symbol recognition resource that processes each area of interest has successfully produced alphanumeric information representative of the second indicia; and
    (i) transmitting to the visual display a single merged pixel image for each area of interest for which the automated symbol recognition resource has failed to produce alphanumeric information representative of the second indicia.

8. The method of claim 6 further comprising the steps of:
    before performing step (c), compressing the pixel image produced in step (b) to reduce the amount of pixel data used to represent areas of the document bearing no indicia detectable in said second mode; and
    before performing said pixel-for-pixel merge, decompressing the pixel data stored in step (c) to obtain the pixel image of step (b).

9. The method of claim 1 further comprising scanning multiple documents bearing said first and second indicia, building a queue of areas of interest from multiple documents that is used to sequentially transfer the pixel images of each area of interest to the appropriate automated symbol recognition resource and, following processing of an area of interest, providing an edit status code for that area of interest to indicate whether or not the automated symbol recognition resource was able to successfully process the pixel image for that area of interest.

10. Apparatus for extracting information from a document bearing first indicia detectable in a first scan mode using light in a first spectral range but not detectable in a second scan mode using light outside the first spectral range and bearing second indicia detectable in either said first scan mode or second scan mode, said second indicia representing information encoded in a plurality of encoded forms, each encoded form decodable into alphanumeric data by one of plurality of automated symbol recognition resources, comprising:

(a) means for defining at least two areas of interest on said document, each comprising less than the entire document, in which said second indicia representing information encoded in a plurality of forms may appear, said definition for each area of interest including information specifying the form of encoding for said second indicia and a content test corresponding to the form of encoding to determine if any second indicia in the specified form of encoding are present in the area of interest;

(b) means for scanning said document in said second mode, using a scanner that produces a first pixel image of the second indicia detected, said first pixel image excluding said first indicia;

(c) means for storing the pixel data from the first pixel image in a memory device;

(d) means for selecting one or more areas of interest from those defined for said document, applying the content test defined for the area of interest to said first pixel image and, if the content test is satisfied, processing the first pixel image of said area of interest with one of said plurality of automated symbol recognition resources suitable for the form of encoding specified for the second indicia in the selected area of interest; and (e) means for producing one or more output records incorporating alphanumeric information representative of the second indicia in said plurality of areas of interest produced by said selecting and processing means.

11. The apparatus of claim 10, further comprising means for compressing the first pixel image to reduce the amount of pixel data used to represent areas of the document bearing no indicia detectable in said second mode.

12. The apparatus of claim 10 further comprising means for transmitting a pixel image of each area of interest containing said second indicia to a visual display for editorial intervention.

13. The apparatus of claim 10 wherein the means for selecting and processing an area of interest comprises means for processing with an automated symbol recognition resource selected from the group consisting of: a bar code reader, an optical mark reader, a font OCR reader, a reader of handprinted numeric data and a reader of handprinted alphanumeric data.

14. The apparatus of claim 10 further comprising:
means for scanning a copy of said document containing only said first indicia in said first mode, using a scanner that produces a second pixel image of the first indicia detected; and
means for storing the pixel data from the second pixel image in a computer storage device.

15. The apparatus of claim 11 further comprising means for decompressing the stored pixel data to obtain the first pixel image and means for performing a pixel-for-pixel merge of the first and second pixel images to produce a single merged pixel image containing both first and second indicia within said at least one area of interest.

16. The method of claim 10 further comprising:
means for scanning multiple documents bearing said first and second indicia;
means for building a queue of areas of interest from multiple documents that is used to sequentially transfer the pixel images of each area of interest to the appropriate automated symbol recognition resource; and
means for providing an edit status code for each area of interest following its processing, to indicate whether or not the automated symbol recognition resource was able to successfully process the pixel image for that area of interest.

17. A method for extracting information from a form document bearing pre-printed indicia and variable indicia responsive to said pre-printed indicia, said variable indicia representing information encoded in a plurality of encoded forms, each encoded form decodable by one of a plurality of automated symbol recognition resources, said method comprising:

(a) defining at least two areas of interest on said document, each comprising less than the entire document, in which said variable indicia representing information encoded in a plurality of forms may appear, said definition for each area of interest including information specifying the form of encoding for said variable indicia, and a content test corresponding to the form of encoding to determine if any second indicia in the specified form of encoding are present in the area of interest;

(b) scanning said document using a scanner that produces a pixel image of both pre-printed and variable indicia;

(c) storing the pixel data obtained from step (b) in a memory device;

(d) selecting an area of interest from those defined for said document, applying the content test defined for the area of interest and, if the content test is satisfied, processing the pixel image of said area of interest with one of said plurality of automated symbol recognition resources suitable for the form of encoding specified for the variable indicia in the area of interest; and (e) producing one or more output records incorporating alphanumeric information representative of said variable indicia in said plurality of areas of interest produced by the processing of step (d).

* * * * *